United States Patent
Horikawa

(10) Patent No.: US 7,568,028 B2
(45) Date of Patent: Jul. 28, 2009

(54) BOTTLENECK DETECTION SYSTEM, MEASUREMENT OBJECT SERVER, BOTTLENECK DETECTION METHOD AND PROGRAM

(75) Inventor: Takashi Horikawa, Tokyo (JP)

(73) Assignee: NEC Corporation (JP)

( * ) Notice: Subject to any disclaimer, the term of this patent is extended or adjusted under 35 U.S.C. 154(b) by 519 days.

(21) Appl. No.: 11/357,479

(22) Filed: Feb. 17, 2006

(65) Prior Publication Data

US 2006/0190596 A1    Aug. 24, 2006

(30) Foreign Application Priority Data

Feb. 18, 2005   (JP)   ............... 2005-042333

(51) Int. Cl.
*G06F 11/30*  (2006.01)
(52) U.S. Cl. .............. 709/224; 709/203; 709/227; 702/185; 714/39
(58) Field of Classification Search .......... 709/224, 709/227, 229, 203; 370/234; 702/186, 185
See application file for complete search history.

(56) References Cited

U.S. PATENT DOCUMENTS 7,225,271 B1 *   5/2007   DiBiasio et al. ............ 709/240
7,242,668 B2 *   7/2007   Kan et al. ................... 370/234
7,424,528 B2 *   9/2008   Cherkasova et al. ......... 709/224
2005/0050404 A1 *  3/2005  Castelli et al. ................. 714/57

FOREIGN PATENT DOCUMENTS

JP   2001-14189   1/2001

OTHER PUBLICATIONS

Performance Analysis of a Client-Server System Using Queueing Networks: A Case Study T. Horikawa, A. Tanaka and I Kino. HY Perform ix.

* cited by examiner

*Primary Examiner*—Khanh Q Dinh
(74) *Attorney, Agent, or Firm*—Ostrolenk, Faber, LLP

(57) ABSTRACT

A bottleneck detection system, a measurement object server, a bottleneck detection method and a program capable of specifying a factor that causes a bottleneck on the occasion of concurrent processing of a plurality of transactions. A tracer collects execution histories of a measurement object server processing transactions with a specified amount of load. An analyzer receives the execution histories from the tracer and analyzes them to measure performance indices with respect to software components in the measurement object server. A determination section receives the analysis results from the analyzer and, processes a value that indicates the relation between the amount of load and each of the performance indices by a prescribed algorithm.

8 Claims, 11 Drawing Sheets

F I G. 4

| REPRESENTATION | MEANING |
|---|---|
| PRpn | RETURN OF PROCESS pn (PROCESS pn STARTS / RESTARTS USING CPU) |
| PSpn | SAVE OF PROCESS pn (PROCESS pn SUSPENDS / TERMINATES USING CPU) |

F I G. 5

| REPRESENTATION | MEANING |
|---|---|
| APNi | SOFTWARE COMPONENT N INITIATES TRANSACTION PROCESSING |
| APNo | SOFTWARE COMPONENT N TERMINATES TRANSACTION PROCESSING |

F I G. 9

| INDEX | AMOUNT OF LOAD | RAMP-UP TIME | MEASUREMENT TIME | RAMP-DOWN TIME |
|---|---|---|---|---|
| 1 | 1 TRANSACTION / SECOND | 10 SECONDS | 100 SECONDS | 15 SECONDS |
| 2 | 5 TRANSACTIONS / SECOND | 10 SECONDS | 50 SECONDS | 15 SECONDS |
| 3 | 10 TRANSACTIONS / SECOND | 5 SECONDS | 20 SECONDS | 15 SECONDS |
| 4 | 50 TRANSACTIONS / SECOND | 5 SECONDS | 10 SECONDS | 15 SECONDS |
| 5 | 100 TRANSACTIONS / SECOND | 2 SECONDS | 5 SECONDS | 15 SECONDS |

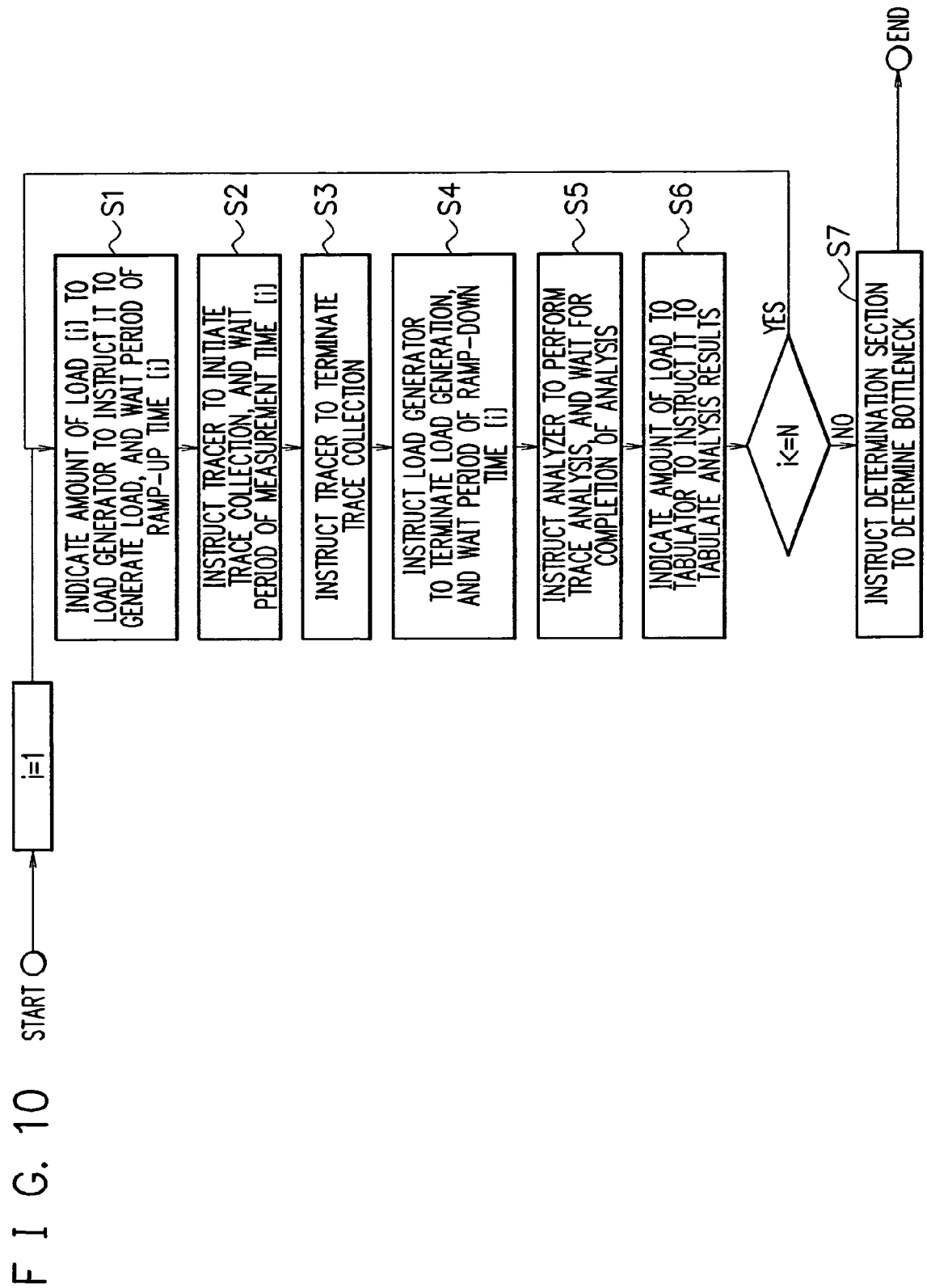

F I G. 11

| INDEX | AMOUNT OF LOAD | SOFTWARE COMPONENT 1 | | SOFTWARE COMPONENT 2 | | SOFTWARE COMPONENT 3 | |
|---|---|---|---|---|---|---|---|
| | | ELAPSED TIME | CPU TIME | ELAPSED TIME | CPU TIME | ELAPSED TIME | CPU TIME |
| 1 | 1 TRANSACTION / SECOND | 10 SECONDS | 10 SECONDS | 5 SECONDS | 5 SECONDS | 20 SECONDS | 20 SECONDS |
| 2 | 5 TRANSACTIONS / SECOND | 15 SECONDS | 11 SECONDS | 15 SECONDS | 10 SECONDS | 30 SECONDS | 21 SECONDS |
| 3 | 10 TRANSACTIONS / SECOND | 25 SECONDS | 11 SECONDS | 40 SECONDS | 20 SECONDS | 50 SECONDS | 22 SECONDS |
| 4 | 50 TRANSACTIONS / SECOND | 40 SECONDS | 12 SECONDS | 100 SECONDS | 30 SECONDS | 80 SECONDS | 25 SECONDS |
| 5 | 100 TRANSACTIONS / SECOND | 70 SECONDS | 13 SECONDS | 200 SECONDS | 40 SECONDS | 140 SECONDS | 28 SECONDS |

FIG. 12

| INDEX | SOFTWARE COMPONENT 1 | | SOFTWARE COMPONENT 2 | | SOFTWARE COMPONENT 3 | | AVERAGE | |
|---|---|---|---|---|---|---|---|---|
| | WALL-TO-CPU TIME RATIO | CPU TIME RATIO | WALL-TO-CPU TIME RATIO | CPU TIME RATIO | WALL-TO-CPU TIME RATIO | CPU TIME RATIO | WALL-TO-CPU TIME RATIO | CPU TIME RATIO |
| 1 | 1.0 | 1.0 | 1.0 | 1.0 | 1.0 | 1.0 | 1.0 | 1.0 |
| 2 | 1.36 | 1.1 | 1.5 | 2.0 | 1.43 | 1.05 | 1.43 | 1.38 |
| 3 | 2.27 | 1.1 | 2.0 | 4.0 | 2.27 | 1.1 | 2.18 | 2.07 |
| 4 | 3.33 | 1.2 | 3.33 | 6.0 | 3.2 | 1.25 | 3.29 | 2.82 |
| 5 | 5.38 | 1.3 | 5.0 | 8.0 | 5.0 | 1.4 | 5.13 | 3.57 |

US 7,568,028 B2

BOTTLENECK DETECTION SYSTEM, MEASUREMENT OBJECT SERVER, BOTTLENECK DETECTION METHOD AND PROGRAM

FIELD OF THE INVENTION

The present invention relates to a bottleneck detection system, a measurement object server, a bottleneck detection method and a program for detecting a bottleneck on the occasion of concurrent processing of a plurality of transactions.

BACKGROUND OF THE INVENTION

In Takashi Horikawa, "Performance Analysis of a Client-Server System Using Queueing Networks: A Case Study," Int. Trans. Opl Res. Vol. 4, No. 3, pp. 199-209, 1997, there is described an example of a technology to evaluate the performance of a system (hereinafter referred to as "server") that concurrently processes a plurality of processing or computing requirements (hereinafter referred to as "transactions").

According to the technology, an evaluation is made as to the performance of a server processing a plurality of transactions (mainly the relation between the throughput of the server and response times for transactions) by using performance basic data: the time spent on server resources (CPUs and disks) used to process a single transaction, and a performance evaluation model based on a queuing network theory.

Here, for example, as in a description shown in http://www.hyperformix.com/Default.asp?Page=210, a performance simulator may be used as the performance evaluation model. In this case, input data and output results of the performance evaluation are similar to those of the aforementioned technology.

With the performance evaluation model used in the technology, the performance is evaluated on the assumptions as follows:

1) The server resource time required to process a single transaction is unchanged even if there is a variation in the number of transactions to be processed by the server per unit of time 2) A plurality of transactions compete only for server resources corresponding to input data Thus, for a server (including software that processes transactions) that satisfies those conditions, the result (the relation between the throughput of the server and response times for transactions) obtained by the performance evaluation model sufficiently reflects the actual server performance.

On the other hand, in the case of a server that does not satisfy the condition 1), the server has a bottleneck in the server resource whose utilization increases when processing a plurality of transactions.

Besides, in the case of a server that does not satisfy the condition 2), a factor that is not reflected in the performance evaluation model constitutes the bottleneck of the real server. Consequently, there occurs a problem (performance problem) that the performance thereof is lower than the result obtained by the performance evaluation model.

FIGS. 1 and 2 are diagrams showing conditions where a server having four CPUs (Central Processing Units) concurrently starts processing four transactions to illustrate concrete examples of the problem.

FIG. 1 shows the case where there is a process that requires exclusive control (that cannot be processed concurrently with other transactions) during transaction processing, and a busy wait is used by a CPU to obtain the execution permission.

In this case, it takes 3 units of CPU time to process a single transaction. In FIG. 1, however, the processing of transactions requires 3, 4, 5 and 6 units of CPU time, respectively. That is, on the average, the CPU time taken to process a single transaction increases to 4.5 units.

FIG. 2 shows the case where a process that requires exclusive control uses semaphores, etc. to obtain the execution permission without using a CPU. When not performing exclusive control, the server having four CPUs can process 4/3 transactions each requiring 3 units of CPU processing per unit of time. In FIG. 2, however, the semaphores used for exclusive control constitute a bottleneck, and the server can process only a single transaction per unit of time. Namely, the server performance is lower than the evaluation.

Additionally, in Japanese Patent Application laid open No. 2001-14189, for example, there has been proposed a technology to find a transaction processing process that constitutes a bottleneck in a transaction processing system. According to the technology, each transaction processing process is provided with an interface to send back CPU utilization time. The processing performance of each transaction processing process can be measured together with that of the entire transaction processing system, and the processing performances of the individual processes are measured at the same time.

The conventional technologies, however, have the following problems.

It is necessary to find and eliminate the bottleneck of a real server to solve the aforementioned performance problems so that the server performs as evaluated by the performance evaluation model. However, in the conventional technologies, there has been no standard method to find out the factor that causes the bottleneck and the cause (whether the bottleneck is caused as in the case of FIG. 1 or 2). Consequently, an expert who has a special knowledge has to check the operation of a server using a combination of various measurement tools to evaluate the bottleneck based on the results and his/her experience. In other words, the bottleneck can be detected by only limited experts. Further, a considerable amount of time is required to find the bottleneck, and if the expert has missed the evaluation, countermeasures taken afterwards come to nothing.

That is, in an information processing system, especially, in a server that concurrently processes a plurality of transactions, even if there is no problem in the operation for processing a single transaction, a bottleneck occurs on the occasion of concurrent processing of a plurality of transactions. As a result, the system or server may not be able to perform as originally expected. To take countermeasures against the problem, it is necessary to specify the factor that causes the bottleneck in transaction processing software in question and the cause. However, there has been no systematic method to accomplish such purpose, and an expert has tried to find the cause by appropriately using various tools for monitoring the operating condition of a server. This requires a considerable amount of time and presents a substantial human resource problem, resulting in an increase in system configuration costs.

SUMMARY OF THE INVENTION

It is therefore an object of the present invention to provide a bottleneck detection system, a measurement object server, a bottleneck detection method and software capable of specifying the factor that causes a bottleneck on the occasion of concurrent processing of a plurality of transactions.

In accordance with the first aspect of the present invention, to achieve the object mentioned above, there is provided a bottleneck detection system comprising a tracer for collecting execution histories of a measurement object server processing transactions with a specified amount of load, an analyzer for receiving the execution histories from the tracer and analyzing them to measure performance indices with respect to software components in the measurement object server, and a determination section for receiving the analysis results from the analyzer and, based on an obtained value that indicates the amount of load, processing a value that indicates the relation between the amount of load and each of the performance indices by a prescribed algorithm to detect a bottleneck.

In accordance with the second aspect of the present invention, there is provided a bottleneck detection system comprising a load generator for sending transactions to a measurement object server according to a specified amount of load, a tracer for collecting execution histories of the measurement object server processing the transactions, an analyzer for receiving the execution histories from the tracer and analyzing them to measure performance indices with respect to software components in the measurement object server, and a determination section for receiving the analysis results from the analyzer and, based on an obtained value that indicates the amount of load, processing a value that indicates the relation between the amount of load and each of the performance indices by a prescribed algorithm to detect a bottleneck.

In accordance with the third aspect of the present invention, there is provided a bottleneck detection system comprising a measurement object server for processing transactions, a load generator for sending transactions to the measurement object server according to a specified amount of load, a tracer for collecting execution histories of the measurement object server processing the transactions, an analyzer for receiving the execution histories from the tracer and analyzing them to measure performance indices with respect to software components in the measurement object server, and a determination section for receiving the analysis results from the analyzer and, based on an obtained value that indicates the amount of load, processing a value that indicates the relation between the amount of load and each of the performance indices by a prescribed algorithm to detect a bottleneck.

In accordance with the fourth aspect of the present invention, the bottleneck detection system in one of the first to third aspects further comprises a tabulator for receiving the analysis results from the analyzer and, based on an obtained value that indicates the amount of load, creating an analysis result table that indicates the relation between the amount of load and each of the performance indices, wherein the determination section processes values stored in the analysis result table by prescribed algorithms to detect a bottleneck.

In accordance with the fifth aspect of the present invention, in the bottleneck detection system in one of the first to fourth aspects, the determination section processes values by prescribed algorithms to detect a bottleneck factor and the cause.

In accordance with the sixth aspect of the present invention, in the bottleneck detection system in one of the first to fifth aspects, the amount of load is specified by a controller.

In accordance with the seventh aspect of the present invention, in the bottleneck detection system in one of the first to sixth aspects, the value that indicates the amount of load is obtained from a controller.

In accordance with the eighth aspect of the present invention, in the bottleneck detection system in one of the first to seventh aspects, the tracer collects at least two execution histories of the measurement object server when the server is overloaded (highly loaded) and underloaded (lowly loaded), and the determination section compares the resource utilization times and the elapsed times as the performance indices of the overloaded and underloaded server to detect a bottleneck.

In accordance with the ninth aspect of the present invention, in the bottleneck detection system in one of the first to eighth aspects, the measurement object server includes kernel probes installed in the OS (Operating System) kernel and application probes installed in the transaction processing software. The tracer collects at least two execution histories of the measurement object server when the server is overloaded and underloaded from the kernel probes and the application probes. The analyzer obtains the resource utilization time and the elapsed time as the performance indices with respect to each of the software components separated by the application probes. Based on the performance indices, the determination section specifies as a bottleneck the performance index of a software component indicating a larger time prolongation or delay as load increases compared to those of other software components.

In accordance with the tenth aspect of the present invention, in the bottleneck detection system in one of the first to ninth aspects, the prescribed algorithms obtain the wall-to-CPU time ratio $[i]$=elapsed or wall time $[i]$/CPU time $[i]$ and the CPU time ratio $[i]$=CPU time $[i]$/CPU time $[1]$ with respect to each software component in the analysis result table, and then obtain the average of the wall-to-CPU time ratios $[i]$ and that of the CPU time ratios $[i]$ of all the software components. The determination section compares the wall-to-CPU time ratio and the CPU time ratio of each software component with the respective average values to find a factor or a software component with a value that becomes substantially larger than the average value as load increases. The determination section recognizes as a bottleneck the CPU time of a software component with the CPU time ratio that becomes substantially larger than the average value. On the other hand, when the wall-to-CPU time ratio of a software component becomes substantially larger than the average value, the determination section determines that a factor other than the CPU time of the software component is a bottleneck.

In accordance with the eleventh aspect of the present invention, there is provided a measurement object server for processing transactions sent from a load generator according to a specified amount of load, the bottleneck of which is detected by the steps of a tracer collecting execution histories of the measurement object server processing the transactions, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm.

In accordance with the twelfth aspect of the present invention, in the measurement object server in the eleventh aspects, the bottleneck detection steps further include the steps of a tabulator receiving the analysis results from the analyzer and, based on an obtained value that indicates the amount of load, creating an analysis result table that indicates the relation between the amount of load and each of the performance indices, and the determination section processing values stored in the analysis result table by prescribed algorithms.

In accordance with the thirteenth aspect of the present invention, in the measurement object server in the eleventh or twelfth aspect, the bottleneck factor and the cause are specified by the determination section processing values by prescribed algorithms.

In accordance with the fourteenth aspect of the present invention, in the measurement object server in one of the eleventh to thirteenth aspects, the amount of load is specified by a controller.

In accordance with the fifteenth aspect of the present invention, in the measurement object server in one of the eleventh to fourteenth aspects, the value that indicates the amount of load is obtained from a controller.

In accordance with the sixteenth aspect of the present invention, in the measurement object server in one of the eleventh to fifteenth aspects, the tracer collects at least two execution histories of the measurement object server when the server is overloaded and underloaded, and the determination section compares the resource utilization times and the elapsed times as the performance indices of the overloaded and underloaded server.

In accordance with the seventeenth aspect of the present invention, the measurement object server in one of the eleventh to sixteenth aspects includes kernel probes installed in the OS kernel and application probes installed in the transaction processing software. The tracer collects at least two execution histories of the measurement object server when the server is overloaded and underloaded from the kernel probes and the application probes. The analyzer obtains the resource utilization time and the elapsed time as the performance indices with respect to each of the software components separated by the application probes. Based on the performance indices, the determination section specifies as a bottleneck the performance index of a software component indicating a larger time prolongation as load increases compared to that of other software components.

In accordance with the eighteenth aspect of the present invention, in the measurement object server in one of the eleventh to seventeenth aspects, the prescribed algorithms obtain the wall-to-CPU time ratio [i]=wall time [i]/CPU time [i] and the CPU time ratio [i]=CPU time [i]/CPU time [1] with respect to each software component in the analysis result table, and then obtain the average of the wall-to-CPU time ratios [i] and that of the CPU time ratios [i] of all the software components. The wall-to-CPU time ratio and the CPU time ratio of each software component are compared to the respective average values to find a software component with a value that becomes substantially larger than the average value as load increases. The CPU time of a software component with the CPU time ratio that becomes substantially larger than the average value is regarded as the bottleneck. On the other hand, when the wall-to-CPU time ratio of a software component becomes substantially larger than the average value, a factor other than the CPU time of the software component is regarded as a bottleneck.

In accordance with the nineteenth aspect of the present invention, there is provided a bottleneck detection method comprising the steps of a tracer collecting execution histories of a measurement object server processing transactions with a specified amount of load, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the twentieth aspect of the present invention, there is provided a bottleneck detection method comprising the steps of a load generator sending transactions to a measurement object server according to a specified amount of load, a tracer collecting execution histories of the measurement object server processing the transactions, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the twenty-first aspect of the present invention, there is provided a bottleneck detection method comprising the steps of a load generator sending transactions to a measurement object server according to a specified amount of load, the measurement object server processing the transactions, a tracer collecting execution histories of the measurement object server processing the transactions, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the twenty-second aspect of the present invention, the bottleneck detection method in one of the nineteenth to twenty-first aspects further comprises the step of a tabulator receiving the analysis results from the analyzer and, based on an obtained value that indicates the amount of load, creating an analysis result table that indicates the relation between the amount of load and each of the performance indices, wherein the determination section processes values stored in the analysis result table by prescribed algorithms to detect a bottleneck.

In accordance with the twenty-third aspect of the present invention, in the bottleneck detection method in one of the nineteenth to twenty-second aspects, the determination section processes values by prescribed algorithms to detect a bottleneck factor and the cause.

In accordance with the twenty-fourth aspect of the present invention, in the bottleneck detection method in one of the nineteenth to twenty-third aspects, the amount of load is specified by a controller.

In accordance with the twenty-fifth aspect of the present invention, in the bottleneck detection method in one of the nineteenth to twenty-fourth aspects, the value that indicates the amount of load is obtained from a controller.

In accordance with the twenty-sixth aspect of the present invention, in the bottleneck detection method in one of the nineteenth to twenty-fifth aspects, the tracer collects at least two execution histories of the measurement object server when the server is overloaded and underloaded, and the determination section compares the resource utilization times and the elapsed times as the performance indices of the overloaded and underloaded server to detect a bottleneck.

In accordance with the twenty-seventh aspect of the present invention, in the bottleneck detection method in one of the nineteenth to twenty-sixth aspects, the measurement object server includes kernel probes installed in the OS kernel and application probes installed in the transaction processing software. The tracer collects at least two execution histories of the measurement object server when the server is overloaded and underloaded from the kernel probes and the application probes. The analyzer obtains the resource utilization time and the elapsed time as the performance indices with respect to each of the software components separated by the application probes. Based on the performance indices, the determination section specifies as a bottleneck the performance index of a software component indicating a larger time prolongation as load increases compared to that of other software components.

In accordance with the twenty-eighth aspect of the present invention, in the bottleneck detection method in one of the nineteenth to twenty-seventh aspects, the prescribed algorithms obtain the wall-to-CPU time ratio [i]=wall time [i]/CPU time [i] and the CPU time ratio [i]=CPU time [i]/CPU time [1] with respect to each software component in the analysis result table, and then obtain the average of the wall-to-CPU time ratios [i] and that of the CPU time ratios [i] of all the software components. The determination section compares the wall-to-CPU time ratio and the CPU time ratio of each software component with the respective average values to find a software component with a value that becomes substantially larger than the average value as load increases. The determination section recognizes as a bottleneck the CPU time of a software component with the CPU time ratio that becomes substantially larger than the average value. On the other hand, when the wall-to-CPU time ratio of a software component becomes substantially larger than the average value, the determination section determines that a factor other than the CPU time of the software component is a bottleneck.

In accordance with the twenty-ninth aspect of the present invention, there is provided software implementing a bottleneck detection method comprising the steps of a tracer collecting execution histories of a measurement object server processing transactions with a specified amount of load, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the thirtieth aspect of the present invention, there is provided software implementing a bottleneck detection method comprising the steps of a load generator sending transactions to a measurement object server according to a specified amount of load, a tracer collecting execution histories of the measurement object server processing the transactions, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the thirty-first aspect of the present invention, there is provided software implementing a bottleneck detection method comprising the steps of a load generator sending transactions to a measurement object server according to a specified amount of load, the measurement object server processing the transactions, a tracer collecting execution histories of the measurement object server processing the transactions, an analyzer receiving the execution histories from the tracer and analyzing them to measure performance indices with respect to software components in the measurement object server, and a determination section receiving the analysis results from the analyzer and, based on an obtained value that indicates the amount of load, processing a value that indicates the relation between the amount of load and each of the performance indices by a prescribed algorithm to detect a bottleneck.

In accordance with the thirty-second aspect of the present invention, the software in one of the twenty-ninth to thirty-first aspects further implements the step of a tabulator receiving the analysis results from the analyzer and, based on an obtained value that indicates the amount of load, creating an analysis result table that indicates the relation between the amount of load and each of the performance indices, wherein the determination section processes values stored in the analysis result table by prescribed algorithms to detect a bottleneck.

In accordance with the thirty-third aspect of the present invention, in the software in one of the twenty-ninth to thirty-second aspects, the determination section processes values by prescribed algorithms to detect a bottleneck factor and the cause.

In accordance with the thirty-fourth aspect of the present invention, in the software in one of the twenty-ninth to thirty-third aspects, the amount of load is specified by a controller.

In accordance with the thirty-fifth aspect of the present invention, in the software in one of the twenty-ninth to thirty-fourth aspects, the value that indicates the amount of load is obtained from a controller.

In accordance with the thirty-sixth aspect of the present invention, in the software in one of the twenty-ninth to thirty-fifth aspects, the tracer collects at least two execution histories of the measurement object server when the server is overloaded and underloaded, and the determination section compares the resource utilization times and the elapsed times as the performance indices of the overloaded and underloaded server to detect a bottleneck.

In accordance with the thirty-seventh aspect of the present invention, in the software in one of the twenty-ninth to thirty-sixth aspects, the measurement object server includes kernel probes installed in the OS kernel and application probes installed in the transaction processing software. The tracer collects at least two execution histories of the measurement object server when the server is overloaded and underloaded from the kernel probes and the application probes. The analyzer obtains the resource utilization time and the elapsed time as the performance indices with respect to each of the software components separated by the application probes. Based on the performance indices, the determination section specifies as a bottleneck the performance index of a software component indicating a larger time prolongation as load increases compared to that of other software components.

In accordance with the thirty-eighth aspect of the present invention, in the software in one of the twenty-ninth to thirty-seventh aspects, the prescribed algorithms obtain the wall-to-CPU time ratio [i]=wall time [i]/CPU time [i] and the CPU time ratio [i]=CPU time [i]/CPU time [1] with respect to each software component in the analysis result table, and then obtain the average of the wall-to-CPU time ratios [i] and that of the CPU time ratios [i] of all the software components. The determination section compares the wall-to-CPU time ratio and the CPU time ratio of each software component with the respective average values to find a software component with a value that becomes substantially larger than the average value as load increases. The determination section recognizes as a bottleneck the CPU time of a software component with the CPU time ratio that becomes substantially larger than the average value. On the other hand, when the wall-to-CPU time ratio of a software component becomes substantially larger than the average value, the determination section determines that a factor other than the CPU time of the software component is a bottleneck.

As is described above, in the bottleneck detection system, the measurement object server, the bottleneck detection method and the software in accordance with the present invention, an event trace is obtained by a combination of kernel probes and application probes. The event trace is analyzed to obtain performance indices with respect to each software component to thereby find a bottleneck. Thus, it is possible to specify a software component that causes the bottleneck when the load or transactions processed by the measurement object server increase. In addition, by the analysis of the event trace, the CPU utilization time and the elapsed time are obtained as the performance indices of each software component to find a bottleneck. Thus, it is possible to determine whether the CPU utilization time or another factor causes the bottleneck.

BRIEF DESCRIPTION OF THE DRAWINGS

The exemplary aspects and features of the present invention will become more apparent from the consideration of the following detailed description taken in conjunction with the accompanying drawings in which:

FIG. 4 is a diagram showing the representation and meaning of each event detected by kernel probes;

FIG. 5 is a diagram showing the representation and meaning of each event detected by application probes;

FIG. 9 is a diagram showing an example of a measurement condition table;

FIG. 10 is a flowchart showing the operation of a controller receiving the measurement condition table as input for sequentially sending instructions to other sections;

FIG. 11 is a diagram showing an example of an analysis result table; and

FIG. 12 is a diagram showing an example of the results of calculations based on the analysis result table.

DESCRIPTION OF THE PREFERRED EMBODIMENT

Figure 1:
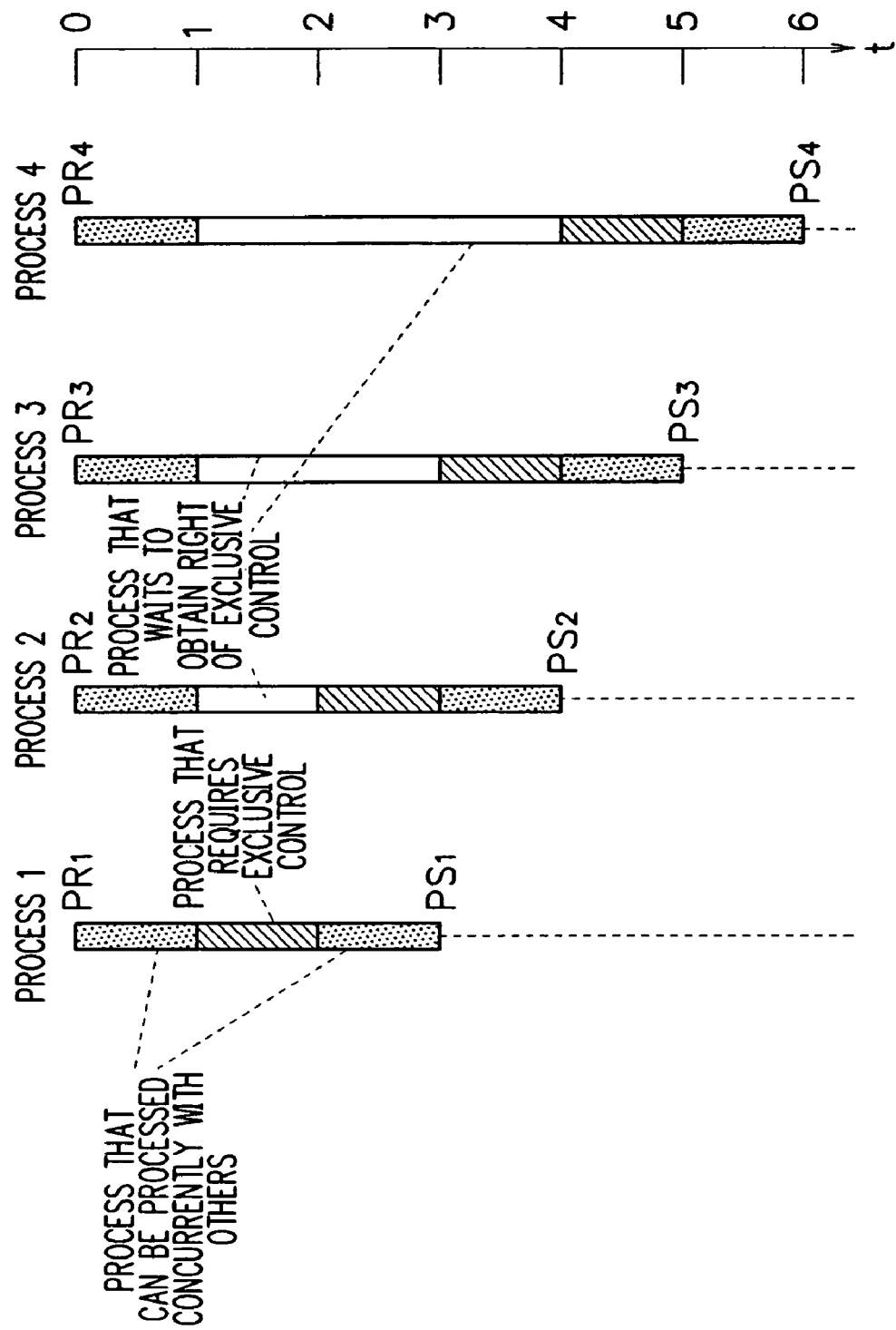
FIG. 1 is a diagram showing a condition where a conventional server having four CPUs concurrently starts processing four transactions.
Figure 2:
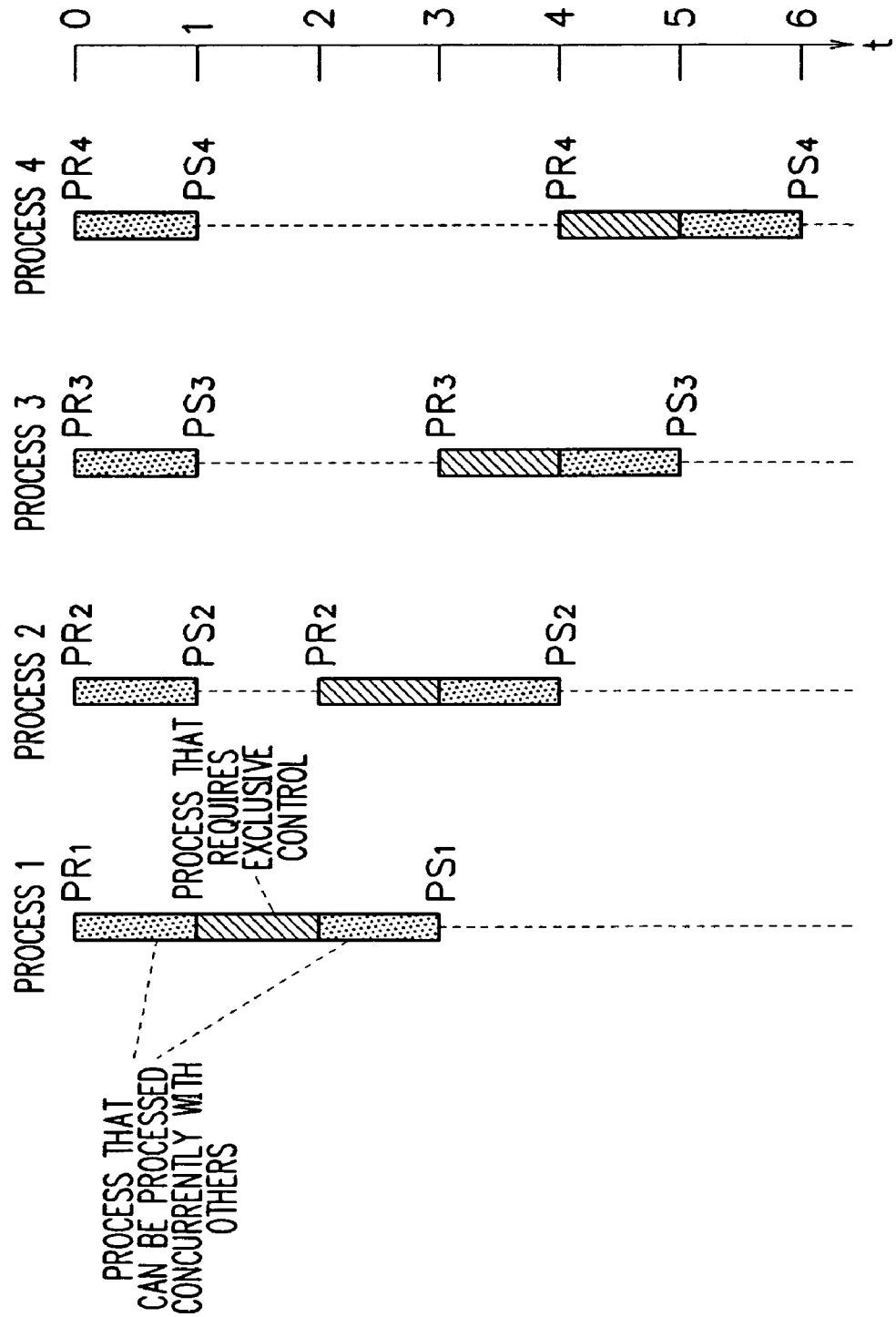
FIG. 2 is a diagram showing another condition where a conventional server having four CPUs concurrently starts processing four transactions.

Referring now to the drawings, a description of a preferred embodiment of the present invention will be given in detail.

Figure 3:
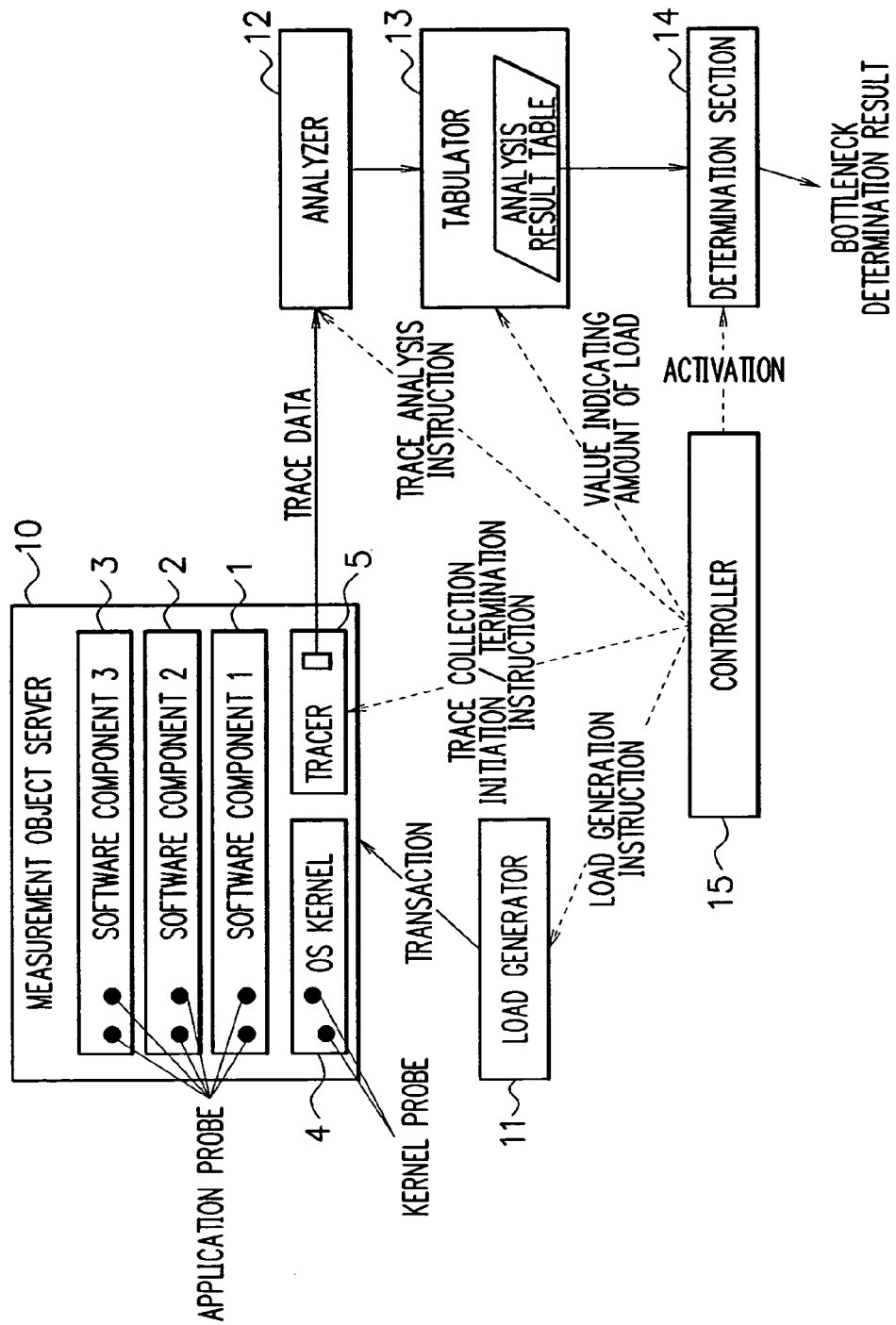
FIG. 3 is a schematic diagram showing a bottleneck detection system according to an embodiment of the present invention.

FIG. 3 is a schematic diagram showing a bottleneck detection system according to an embodiment of the present invention. Referring to FIG. 3, the bottleneck detection system comprises a measurement object server 10 that operates by software control, a load generator 11, an analyzer 12, a tabulator 13, a determination section 14, and a controller 15.

The measurement object server 10 includes software components 1 to 3, an OS (Operating System) kernel 4 and a tracer 5. The OS kernel 4 has built-in kernel probes, while the software components 1 to 3 each have built-in application probes.

The load generator 11 sends transactions to the measurement object server 10 according to the amount of load specified by the controller 15.

The measurement object server 10 receives the transactions sent from the load generator 11 through the OS kernel 4. The OS kernel 4 passes the transactions to the software components 1 to 3 to process them. Thereby, the measurement object server 10 sends the processing results back to the source of the transaction request.

Besides, the tracer 5 receives information concerning software execution status from the kernel probes embedded in the OS kernel 4 and the application probes to record it as time series data (trace data). The tracer 5 initiates and terminates the trace data collection according to instructions from the controller 15.

The analyzer 12 receives the trace data from the tracer 5 in the measurement object server 10 to analyze them according to instructions from the controller 15.

The tabulator 13 receives the analysis results from the analyzer 12 and a value indicating the amount of load from the controller 15 to record them according to instructions from the controller 15.

The controller 15 specifies the amount of load to instruct the load generator 11 to generate the load. The controller 15 also instructs the tracer 5 to initiate and terminate trace data collection. In addition, the controller 15 instructs the analyzer 12 to analyze the trace, and feeds the tabulator 13 with a value indicating the amount of the load to instruct it to perform tabulation. The controller 15 repeatedly performs a series of the operations while changing the amount of load so that the analysis results corresponding to respective amounts of load are stored in the tabulator 13 as an analysis result table.

The determination section 14 receives the analysis result table as input to find the bottleneck of the measurement object server 10 according to instructions from the controller 15.

Referring next to FIGS. 3 to 9, a description will be given in detail of processing operation to detect a bottleneck according to the embodiment of the present invention.

First, transaction processing by the measurement object server 10 will be described.

In the measurement object server 10, the OS kernel 4 and the software components 1 to 3 are involved in transaction processing. The OS kernel 4 is an operating system that supports the concurrent execution of a plurality of software processes (multiprocess). In the OS kernel 4, kernel probes are placed at the parts to return or resume a process (start/restart CPU utilization) and to save a process (suspend/terminate CPU utilization), respectively.

The software components 1 to 3 configure software that processes transactions, and operate in order of the components 1, 2 and 3 to process transactions. In each of the software components 1 to 3, application probes are placed at the start and end points of a transaction processed by the component, respectively.

FIG. 4 is a diagram showing the representation and meaning of each event detected by the kernel probes. FIG. 5 is a diagram showing the representation and meaning of each event detected by the application probes. These representations are used in the following diagrams.

Figure 6:
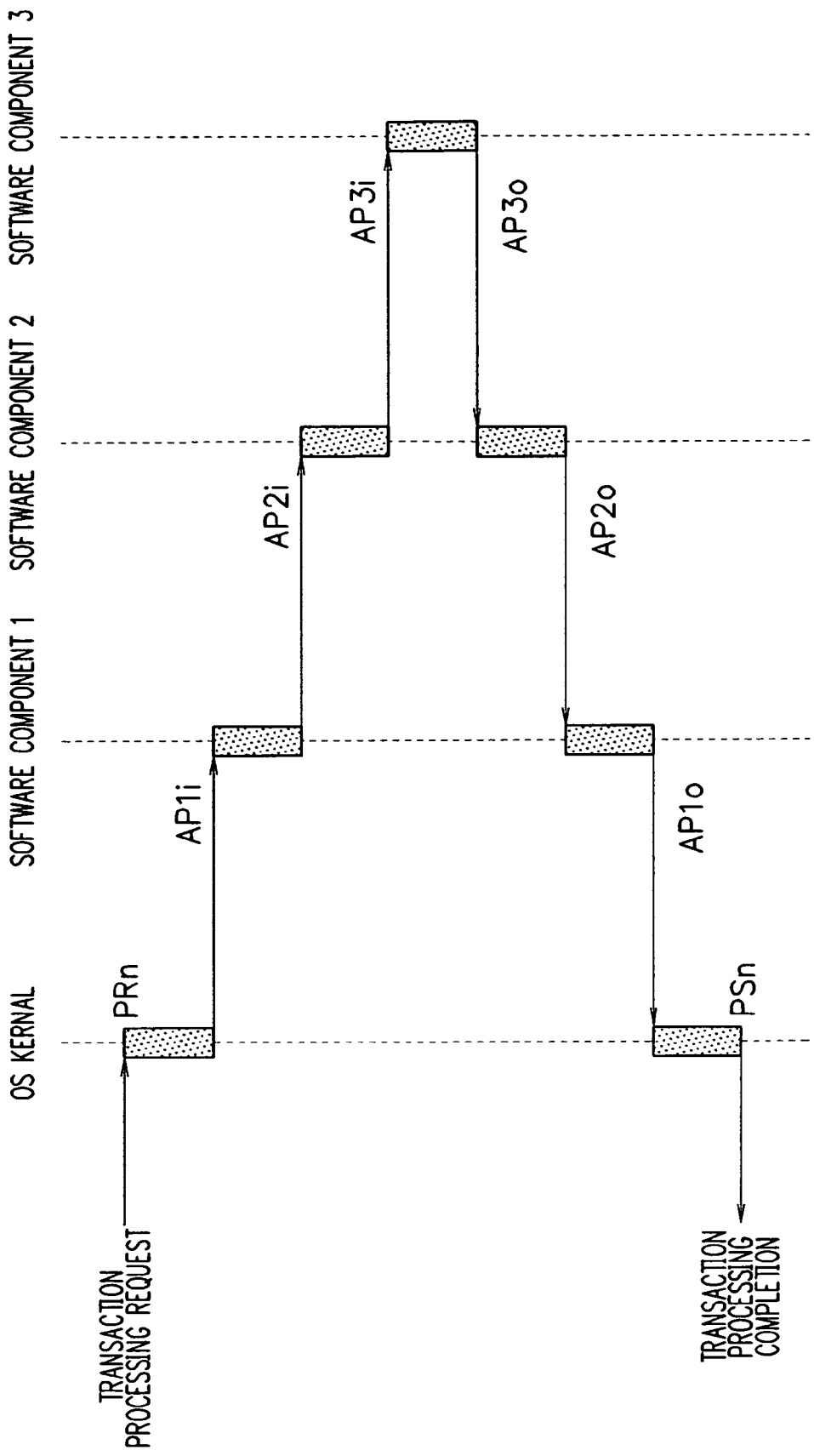
FIG. 6 is a sequence diagram showing the operation of respective software components of a measurement object server for processing a single transaction.

FIG. 6 is a sequence diagram showing the operation of the respective software components (the OS kernel 4 and the software components 1 to 3) of the measurement object server 10 for processing a single transaction.

On receipt of a transaction from the outside of the measurement object server 10, the OS kernel 4 creates a process (n in FIG. 6) for transaction processing and executes the process (event PRn).

Next, the process is transferred from the OS kernel 4 to the software component 1, and the component 1 starts the transaction processing thereof (event AP1i). Subsequently, the software component 1 requests the software component 2 to process the transaction.

Accordingly, the process is transferred from the software component 1 to the software component 2, and the component 2 starts the transaction processing thereof (event AP2i). Thereafter, the software component 2 requests the software component 3 to process the transaction.

Thereby, the process is transferred from the software component 2 to the software component 3, and the component 3 starts the transaction processing thereof (event AP3i).

On completion of the transaction processing, the software component 3 returns the processing result to the software component 2, and terminates the process (event AP3o).

The software component 2 processes the processing result received from the software component 3. The software component 2 returns the processing result to the software component 1, and terminates the process (event AP2o).

The software component 1 processes the processing result received from the software component 2. The software component 1 returns the processing result to the OS kernel 4, and terminates the process (event AP1o).

The OS kernel 4 returns the processing result received from the software component 1 to the source of the transaction request, and completes the execution of the process (n) in charge of the transaction processing (event PSn).

As is described above, one process is created for the processing of a single transaction. The process has a one-to-one correspondence with the transaction to complete the execution of the process on completion of the processing.

Figure 7:
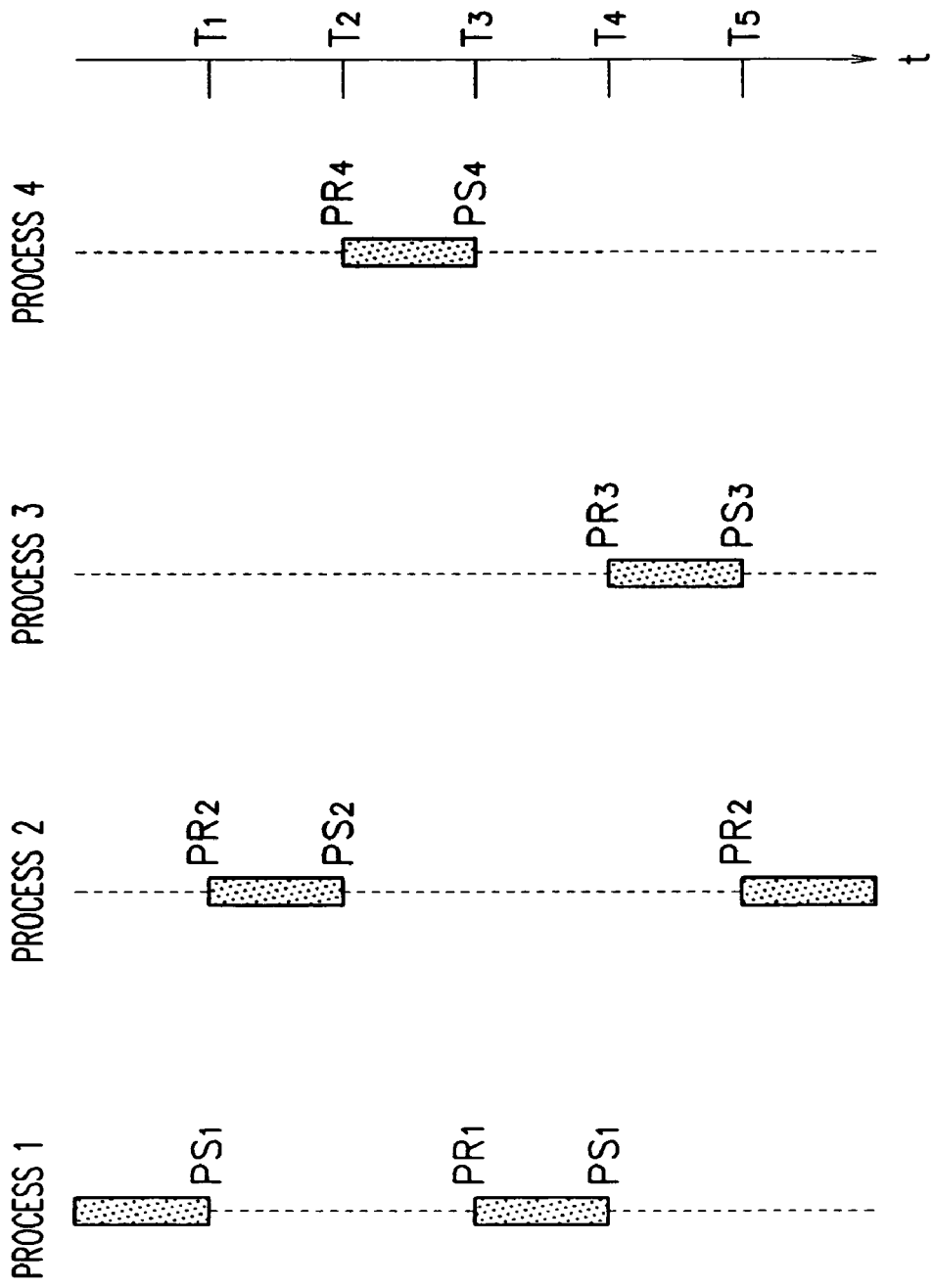
FIG. 7 is a sequence diagram showing the operation of the measurement object server for concurrently processing a plurality of transactions.

FIG. 7 is a sequence diagram showing an example of the operation of the measurement object server 10 for concurrently processing a plurality of transactions. For simplicity, FIG. 7 shows events from the kernel probes only.

Referring to FIG. 7, in the condition where process 1 is operating, the execution of the process 1 is suspended (PS1) and the execution of process 2 is started (PR2) at time T1.

At time T2, the execution of the process 2 is suspended (PS2) and the execution of process 4 is started (PR4).

At time T3, the execution of the process 4 is suspended (PS4) and the execution of the process 1 is restarted (PR1).

At time T4, the execution of the process 1 is suspended (PS1) and the execution of process 3 is started (PR3).

At time T5, the execution of the process 3 is suspended (PS3) and the execution of the process 2 is restarted (PR2).

Such switching of processes is generally performed in the OS that supports multiprocess and performed at the time of autonomous or voluntary CPU utilization suspension or completion by a process or time slice (interrupts that occur at regular intervals).

Figure 8:
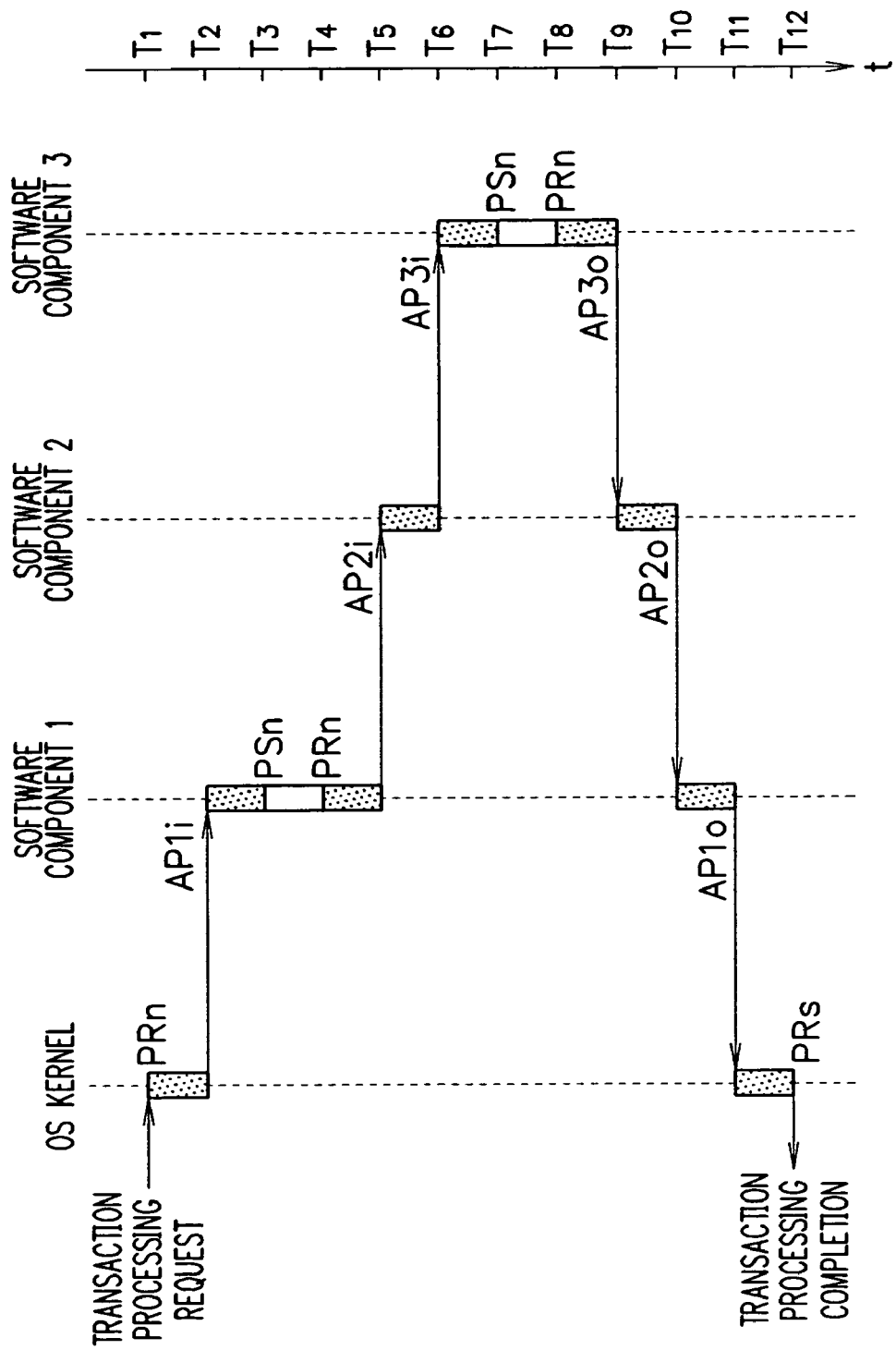
FIG. 8 is a sequence diagram showing operation for processing a single transaction during the concurrent processing of a plurality of transactions.

FIG. 8 is a sequence diagram showing operation for processing a single transaction during the concurrent processing of a plurality of transactions. In FIG. 8, the process in charge of transaction processing is denoted by n as in FIG. 6. The operation of FIG. 8 differs from that of FIG. 6 in that process switching occurs while a CPU is used for transaction processing. In FIG. 8, the process save (event PSn) occurs at time T3 and T7, and the process return or resume (event PRn) occurs at time T4 and T8.

In the following, a description will be given of the tracer 5 and the analysis of an event trace obtained by the tracer 5.

The tracer 5 has the function of recording all events that occur in the measurement object server 10 during a trace collection period as time series data.

An event to be traced herein corresponds to the kernel probes and application probes. That is, when these probes are executed with the execution of software in the measurement object server 10, control is once transferred to the tracer 5. The meaning or content of an event detected by the probes (see FIGS. 4 and 5) and the occurrence time (approximate to the time at which the tracer 5 records the event) are stored as data on one event in a storage provided in the measurement object server 10. After that, the execution of the software is restarted.

The occurrence time of an event may be obtained, for example, with a function offered by the CPU of the measurement object server 10, or may be obtained by other known techniques. As the storage to store trace data may be used an area allocated to trace data in the main storage of the measurement object server 10, or may be used an external storage medium.

The analyzer 12 analyzes trace data collected by the tracer 5 to obtain the CPU time (CPU utilization time) and elapsed time (wall or wall clock time) required for each transaction with respect to each software component. Incidentally, the CPU is given only as an example of a resource. Resources include disk, a network, a memory and the like.

A concrete calculation method will be described taking the event sequence or series of FIG. 8 as an example. Referring to FIG. 8, the software component 1 starts the execution of process (AP1i) at time T2, and transfers the process to the software component 2 at time T5. During the period, the software component 1 suspends the execution of the process (PSn) at time T3, and restarts it at time T4 (hereinafter referred to as first half processing).

In addition, the software component 1 receives the processing result from the software component 2 at time T10, and processes it until time T11. Subsequently, the software component 1 passes the processing result to the OS kernel 4 as well as transferring the process thereto (hereinafter referred to as second half processing).

In this case, the elapsed time which it takes the software component 1 to perform the first half processing is T5−T2, and that to perform the second half processing is T11−T10. Thus, the entire elapsed time is (T5−T2)+(T11−T10).

On the other hand, as to the CPU time for the first half processing, the CPU is not used during a period from time T3 to T4. Therefore, the CPU time can be obtained by subtracting the period from the elapsed time, i.e., (T5−T2)−(T4−T3).

Since the CPU utilization is not suspended during the second half processing, the CPU time for the second half processing is the same as the elapsed time (T11−T10). Thus, the entire CPU time is (T5−T2)−(T4−T3)+(T11−T10).

The elapsed time and CPU time can be calculated for the software components 2 and 3 in the same manner as above. Both the elapsed time and CPU time of the software component 2 are (T6−T5)+(T10−T9). The elapsed time and CPU time of the software component 3 are (T9−T6) and (T9−T6)−(T8−T7), respectively.

As is described above, the elapsed time can be obtained by accumulating periods from when the software component starts its processing to when it transfers the process to another software component based on event time information detected by the application probes. Besides, the CPU time can be obtained by subtracting from the elapsed time a period during which CPU processing is suspended or accumulated periods from a process save event to a process return or resume event detected by the kernel probes.

On the basis of the above understanding, a description will be given of the method of detecting a bottleneck on the occasion of concurrent processing of a plurality of transactions.

FIG. 9 is a diagram showing an example of a measurement condition table. FIG. 10 is a flowchart showing the operation of the controller 15 receiving the measurement condition table (shown in FIG. 9) as input for sequentially sending instructions to other sections.

Each line in the measurement condition table corresponds to one measurement/analysis operation. In FIG. 9, the measurement/analysis operation is performed with respect to five degrees of load (1 transaction per second, 5 transactions per second, 10 transactions per second, 50 transactions per second, and 100 transactions per second).

The controller 15 first performs the measurement/analysis operation on the condition indicated in the first line. More specifically, the controller 15 indicates the amount of load (in this case, 1 transaction per second) listed in the first line of the measurement condition table to the load generator 11 to instruct it to generate the load. Then, the controller 15 waits a period of ramp-up time (a period of time until the measurement object server 10 becomes ready to steadily process the specified amount of load; in this case, 10 seconds) indicated in the first line of the measurement condition table (step S1). On receipt of the load generation instruction, the load generator 11 sends transactions to the measurement object server 10 with specified frequency, and receives the processing results therefrom.

Next, the controller 15 instructs the tracer 5 to initiate the collection of trace data, and waits a period of measurement time (a period of time taken to collect the trace data; in this case, 100 seconds) indicated in the first line of the measurement condition table (step S2).

Thereafter, the controller 15 instructs the tracer 5 to terminate the collection of trace data (step S3). Thereby, the tracer 5 stores the trace data on the record of the operation (software execution history) of the measurement object server 10 during the period from the initiation to termination of the trace collection (measurement time) as previously described for the operation of the tracer 5.

Subsequently, the controller 15 instructs the load generator 11 to terminate the generation of load, and waits a period of ramp-down time (a period of time until the measurement object server 10 returns to idle state after completing the transaction processing processed at that time; in this case, 15 seconds) indicated in the first line of the measurement condition table (step S4).

After that, the controller 15 instructs the analyzer 12 to perform trace analysis, and waits for the completion of the analysis (step 5).

On receipt of the instruction, the analyzer 12 receives the trace data from the tracer 5 to analyze it according to algorithms set therein. Thereby, the analyzer 12 obtains the CPU time and elapsed time with respect to each software component. The analyzer 12 divides each of the values by the number of the transactions processed by the measurement object server 10 during the trace data collection period (in this embodiment, the number of the transactions corresponds to the number of processes for transaction processing performed by the measurement object server 10 during the trace data collection period) to obtain the average value per transaction.

The controller 15 indicates the amount of load (in this case, 1 transaction per second) in the measurement/analysis operation to the tabulator 13 to instruct it to tabulate the analysis results.

Having received the instruction, the tabulator 13 receives the analysis results (the average values of the CPU time and elapsed time per transaction with respect to each software component), and stores them in the analysis result table together with the specified amount of load.

FIG. 11 is a diagram showing an example of the analysis result table. Through the operation described above, the first line (the line in which the amount of load indicates 1 transaction per second) of the analysis result table is created.

By performing a series of the measurement/analysis operation, i.e., the process from step 1 through step 6, on the condition indicated in each line of the measurement condition table shown in FIG. 9 under the control of the controller 15 (corresponding to the loop of FIG. 10), the entire analysis result table of FIG. 11 can be created.

When the analysis result table of FIG. 11 has been created, the controller 15 instructs the determination section 14 to find a bottleneck (step S7).

On receipt of the instruction, the determination section 14 receives the analysis result table from the tabulator 13, and processes it by preset algorithms to find a bottleneck factor and the cause.

The following are the algorithms set in the determination section 14 according to the embodiment of the present invention. First, the determination section 14 obtains the elapsed time-to-CPU time ratio (wall-to-CPU time ratio) [i]=elapsed time [i]/CPU time [i] and the CPU time ratio [i]=CPU time [i]/CPU time [1] with respect to each software component in the analysis result table. Then, the determination section 14 obtains the average of the elapsed time-to-CPU time ratios [i] and that of the CPU time ratios [i] of all the software components. Incidentally, [i] as used herein indicates the index of a value in the i-th line of the column corresponding to each item.

FIG. 12 is a diagram showing an example of the results of calculations based on the analysis result table.

The determination section 14 compares the elapsed time-to-CPU time ratio and the CPU time ratio with the respective average values with respect to each software component. Thereby, the determination section 14 finds a factor whose value becomes substantially larger (e.g., twice or more than twice the average value) than the average value as load increases.

In FIG. 12, the CPU time ratio of the software component 2 becomes substantially larger than the average value. Thus, the determination section 14 determines the CPU time of the software component 2 as a bottleneck.

Besides, if the determination section 14 finds that the elapsed time-to-CPU time ratio of a software component becomes substantially larger than the average value as a result of the calculations, it determines that a factor other than the CPU time of the software component is a bottleneck.

As set forth hereinabove, in accordance with the embodiment of the present invention, it is possible to specify a software component that causes a bottleneck when the load or the number of transactions processed by the measurement object server 10 increases. In addition, a determination can be made as to whether the CPU time or another factor causes the bottleneck.

While one preferred embodiment of the present invention has been shown, it is not so limited but is susceptible of various changes and modifications without departing from the scope and spirit of the present invention. For example, a program implementing the functions of the measurement object server 10 and respective sections may be loaded into a computer and executed to perform the functions of the bottleneck detection system. The program may be loaded into the computer from a computer-readable storage medium such as a CD-ROM (Compact Disc Read Only Memory) and a magnetic optical disk, or downloaded to the computer via a transmission medium such as the Internet and a telephone line.

In the embodiment described above, the bottleneck detection system has a construction in which the measurement object server 10 and individual sections are connected to each other. However, the respective functions may be implemented by a single computer system. Or a plurality of servers or the like may be added to the construction for the respective functions. The bottleneck detection system may comprise the measurement object server 10 having a construction to distribute processing load caused by load generation, a load generation device implementing the load generator 11, and other devices for performing the functions of the respective sections.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A bottleneck detection system comprising:
a measurement object server for processing transactions;
a load generator for sending transactions to the measurement object server according to a specified amount of load;
a tracer for collecting execution histories of the measurement object server processing the transactions;
an analyzer for receiving the execution histories from the tracer and analyzing them to measure performance indices with respect to software components in the measurement object server; and
a determination section for receiving the analysis results from the analyzer and, based on an obtained value that indicates the amount of load, processing a value that indicates the relation between the amount of load and each of the performance indices by a prescribed algorithm to detect a bottleneck,
further comprising a tabulator for receiving the analysis results from the analyzer and, based on an obtained value that indicates the amount of load, creating an analysis result table that indicates the relation between the amount of load and each of the performance indices, wherein the determination section processes values stored in the analysis result table by prescribed algorithms to detect a bottleneck,
wherein the determination section processes the values by the prescribed algorithms to detect a bottleneck factor and the cause,
further comprising a controller for specifying the amount of load,
wherein the controller provides the value that indicates the amount of load,
wherein, the tracer collects at least two execution histories of the measurement object server when the server is overloaded and underloaded; and
the determination section compares the resource utilization times and the elapsed times as the performance indices of the overloaded and underloaded server to detect a bottleneck, and wherein:
the measurement object server includes kernel probes installed in the OS kernel and application probes installed in the transaction processing software;
the tracer collects at least two execution histories of the measurement object server when the server is overloaded and underloaded from the kernel probes and the application probes;
the analyzer obtains the resource utilization time and the elapsed time as the performance indices with respect to each of the software components separated by the application probes; and
based on the performance indices, the determination section specifies as a bottleneck the performance index of a software component indicating a larger time prolongation as load increases compared to that of other software components.

2. The bottleneck detection system claimed in claim 1, wherein:
the prescribed algorithms obtain the wall-to-CPU time ratio [i]=wall time [i]/CPU time [i] and the CPU time ratio [i]=CPU time [i]/CPU time [1] with respect to each software component in the analysis result table, and obtain the average of the wall-to-CPU time ratios [i] and that of the CPU time ratios [i] of all the software components;
the determination section compares the wall-to-CPU time ratio and the CPU time ratio of each software component with the respective average values to find a software component with a value that becomes substantially larger than the average value as load increases;
the determination section recognizes as a bottleneck the CPU time of a software component with the CPU time ratio that becomes substantially larger than the average value; and
when the wall-to-CPU time ratio of a software component becomes substantially larger than the average value, the determination section determines that a factor other than the CPU time of the software component is a bottleneck.

3. A measurement object server for processing transactions sent from a load generator according to a specified amount of load, the bottleneck of which is detected by the steps of:
a tracer collecting execution histories of the measurement object server processing the transactions;
an analyzer receiving the execution histories from the tracer and analyzing them to measure performance indices with respect to software components in the measurement object server; and
a determination section receiving the analysis results from the analyzer and, based on an obtained value that indicates the amount of load, processing a value that indicates the relation between the amount of load and each of the performance indices by a prescribed algorithm,
wherein the bottleneck detection steps further include the steps of:
a tabulator receiving the analysis results from the analyzer and, based on an obtained value that indicates the amount of load, creating an analysis result table that indicates the relation between the amount of load and each of the performance indices; and
the determination section processing values stored in the analysis result table by prescribed algorithms,
wherein the bottleneck factor and the cause are specified by the determination section processing the values by the prescribed algorithms,
wherein the amount of load is specified by a controller,
wherein the value that indicates the amount of load is provided by the controller, wherein the tracer collects at least two execution histories of the measurement object server when the server is overloaded and underloaded; and the determination section compares the resource utilization times and the elapsed times as the performance indices of the overloaded and underloaded server, including kernel probes installed in the OS kernel and application probes installed in the transaction processing software, wherein:

the tracer collects at least two execution histories of the measurement object server when the server is overloaded and underloaded from the kernel probes and the application probes;

the analyzer obtains the resource utilization time and the elapsed time as the performance indices with respect to each of the software components separated by the application probes; and based on the performance indices, the determination section specifies as a bottleneck the performance index of a software component indicating a larger time prolongation as load increases compared to that of other software components.

4. The measurement object server claimed in claim 3, wherein:

the prescribed algorithms obtain the wall-to-CPU time ratio [i]=wall time [i]/CPU time [i] and the CPU time ratio [i]=CPU time [i]/CPU time [1] with respect to each software component in the analysis result table, and obtain the average of the wall-to-CPU time ratios [i] and that of the CPU time ratios [i] of all the software components;

the wall-to-CPU time ratio and the CPU time ratio of each software component are compared to the respective average values to find a software component with a value that becomes substantially larger than the average value as load increases;

the CPU time of a software component with the CPU time ratio that becomes substantially larger than the average value is regarded as the bottleneck; and when the wall-to-CPU time ratio of a software component becomes substantially larger than the average value, a factor other than the CPU time of the software component is regarded as a bottleneck.

5. A bottleneck detection method comprising the steps of:

a load generator sending transactions to a measurement object server according to a specified amount of load;

the measurement object server processing the transactions;

a tracer collecting execution histories of the measurement object server processing the transactions;

an analyzer receiving the execution histories from the tracer and analyzing them to measure performance indices with respect to software components in the measurement object server; and a determination section receiving the analysis results from the analyzer and, based on an obtained value that indicates the amount of load, processing a value that indicates the relation between the amount of load and each of the performance indices by a prescribed algorithm to detect a bottleneck, further comprising the step of a tabulator receiving the analysis results from the analyzer and, based on an obtained value that indicates the amount of load, creating an analysis result table that indicates the relation between the amount of load and each of the performance indices, wherein the determination section processes values stored in the analysis result table by prescribed algorithms to detect a bottleneck wherein the determination section processes the values by the prescribed algorithms to detect a bottleneck factor and the cause, further comprising the step of a controller specifying the amount of load, wherein the controller provides the value that indicates the amount of load, wherein the tracer collects at least two execution histories of the measurement object server when the server is overloaded and underloaded; and the determination section compares the resource utilization times and the elapsed times as the performance indices of the overloaded and underloaded server to detect a bottleneck, the measurement object server includes kernel probes installed in the OS kernel and application probes installed in the transaction processing software;

the tracer collects at least two execution histories of the measurement object server when the server is overloaded and underloaded from the kernel probes and the application probes;

the analyzer obtains the resource utilization time and the elapsed time as the performance indices with respect to each of the software components separated by the application probes; and based on the performance indices, the determination section specifies as a bottleneck the performance index of a software component indicating a larger time prolongation as load increases compared to that of other software components.

6. The bottleneck detection method claimed in claim 5, wherein the prescribed algorithms obtain the wall-to-CPU time ratio [i]=wall time [i]/CPU time [i] and the CPU time ratio [i]=CPU time [i]/CPU time [1] with respect to each software component in the analysis result table, and obtain the average of the wall-to-CPU time ratios [i] and that of the CPU time ratios [i] of all the software components;

the determination section compares the wall-to-CPU time ratio and the CPU time ratio of each software component with the respective average values to find a software component with a value that becomes substantially larger than the average value as load increases;

the determination section recognizes as a bottleneck the CPU time of a software component with the CPU time ratio that becomes substantially larger than the average value; and when the wall-to-CPU time ratio of a software component becomes substantially larger than the average value, the determination section determines that a factor other than the CPU time of the software component is a bottleneck.

7. A computer program embodied on a computer-readable medium and comprising code, the code, when executed, implementing the steps of:

a load generator sending transactions to a measurement object server according to a specified amount of load;

the measurement object server processing the transactions;

a tracer collecting execution histories of the measurement object server processing the transactions;

an analyzer receiving the execution histories from the tracer and analyzing them to measure performance indices with respect to software components in the measurement object server; and a determination section receiving the analysis results from the analyzer and, based on an obtained value that indicates the amount of load, processing a value that indicates the relation between the amount of load and each of the performance indices by a prescribed algorithm to detect a bottleneck, wherein the code further implements the steps of:

a tabulator receiving the analysis results from the analyzer and, based on an obtained value that indicates the amount of load, creating an analysis result table that indicates the relation between the amount of load and each of the performance indices; and the determination section processing values stored in the analysis result table by prescribed algorithms to detect a bottleneck, wherein the determination section processes the values by the prescribed algorithms to detect a bottleneck factor and the cause, wherein the code further implementing the step of a controller specifying the amount of load wherein the controller provides the value that indicates the amount of load, wherein the tracer collects at least two execution histories of the measurement object server when the server is overloaded and underloaded; and the determination section compares the resource utilization times and the elapsed times as the performance indices of the overloaded and underloaded server to detect a bottleneck, the measurement object server includes kernel probes installed in the OS kernel and application probes installed in the transaction processing software;

the tracer collects at least two execution histories of the measurement object server when the server is overloaded and underloaded from the kernel probes and the application probes;

the analyzer obtains the resource utilization time and the elapsed time as the performance indices with respect to each of the software components separated by the application probes; and based on the performance indices, the determination section specifies as a bottleneck the performance index of a software component indicating a larger time prolongation as load increases compared to that of other software components.

8. The computer program claimed in claim 7, wherein:

the prescribed algorithms obtain the wall-to-CPU time ratio [i]=wall time [i]/CPU time [i] and the CPU time ratio [i]=CPU time [i]/CPU time [1] with respect to each software component in the analysis result table, and obtain the average of the wall-to-CPU time ratios [i] and that of the CPU time ratios [i] of all the software components;

the determination section compares the wall-to-CPU time ratio and the CPU time ratio of each software component with the respective average values to find a software component with a value that becomes substantially larger than the average value as load increases;

the determination section recognizes as a bottleneck the CPU time of a software component with the CPU time ratio that becomes substantially larger than the average value; and when the wall-to-CPU time ratio of a software component becomes substantially larger than the average value, the determination section determines that a factor other than the CPU time of the software component is a bottleneck.

* * * * *